United States Patent
Du

(10) Patent No.: US 8,432,857 B2
(45) Date of Patent: Apr. 30, 2013

(54) WIRELESS ACCESS DEVICE AND METHOD OF TRANSMITTING PACKETS

(75) Inventor: Yao-Hong Du, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 12/961,892

(22) Filed: Dec. 7, 2010

(65) Prior Publication Data

US 2011/0149854 A1 Jun. 23, 2011

(30) Foreign Application Priority Data

Dec. 17, 2009 (CN) .......................... 2009 1 0311666

(51) Int. Cl.
*H04W 40/00* (2009.01)

(52) U.S. Cl.
USPC ....................................................... 370/328

(58) Field of Classification Search ................... 370/229, 370/270, 311; 709/235
See application file for complete search history.

(56) References Cited

U.S. PATENT DOCUMENTS

| 2008/0101220 | A1* | 5/2008 | Kim et al. ...................... 370/229 |
| 2009/0109887 | A1 | 4/2009 | Chandra et al. |
| 2009/0279701 | A1* | 11/2009 | Moisand et al. ............. 380/270 |
| 2010/0195548 | A1* | 8/2010 | Navda et al. .................. 370/311 |

FOREIGN PATENT DOCUMENTS

| CN | 1423435 | | 6/2003 |
| CN | 1463099 | | 12/2003 |
| CN | 1925457 | | 3/2007 |
| CN | 101355439 | A * | 1/2009 |
| EP | 1876779 | A2 * | 1/2008 |
| JP | 2006295270 | A * | 10/2006 |
| WO | 0007260 | | 2/2000 |

* cited by examiner

*Primary Examiner* — Luat Phung
*Assistant Examiner* — Parth Patel
(74) *Attorney, Agent, or Firm* — Altis Law Group, Inc.

(57) ABSTRACT

A wireless access device communicates with a plurality of customer premised equipments (CPEs) via a network. The wireless access device establishes a plurality of queues and distributes intervals for each of the CPEs. The wireless access device receives packets from the network, obtains one of the intervals corresponding to one of the CPEs with a MAC address being a destination MAC address of one of the received packets, and stores each of the received packets to one of the queues with sequence number being in the obtained interval. The wireless access device transmits the received packets stored in the plurality of queues in the way of one row by one row.

5 Claims, 4 Drawing Sheets

WIRELESS ACCESS DEVICE AND METHOD OF TRANSMITTING PACKETS

BACKGROUND

1. Technical Field

Embodiments of the present disclosure relate to network communication devices, and more particularly to a wireless access device and method of transmitting packets.

2. Description of Related Art

In a traditional way, a wireless access device transmits packets in sequence according to received time of the packets. In other words, the wireless access device transmits a packet first received, transmits another packet that is received later, that is, the wireless access device transmits the packets by a way of first in first out (FIFO) method.

However, the FIFO method leads to the packets waiting a long time to be transmitted if a speed of transmitting packet is less than a speed of receiving packet on the wireless access device. In that case, performance of transmission of packets using the wireless access device would sharply decrease. Therefore, an improved wireless access device is needed to enhance the performance of dealing with packet and decrease a waiting time of the packet.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be recorded in any type of computer-readable medium or other storage device. Some or all of the methods may alternatively be embodied in specialized computer hardware or communication apparatus.

Figure 1:
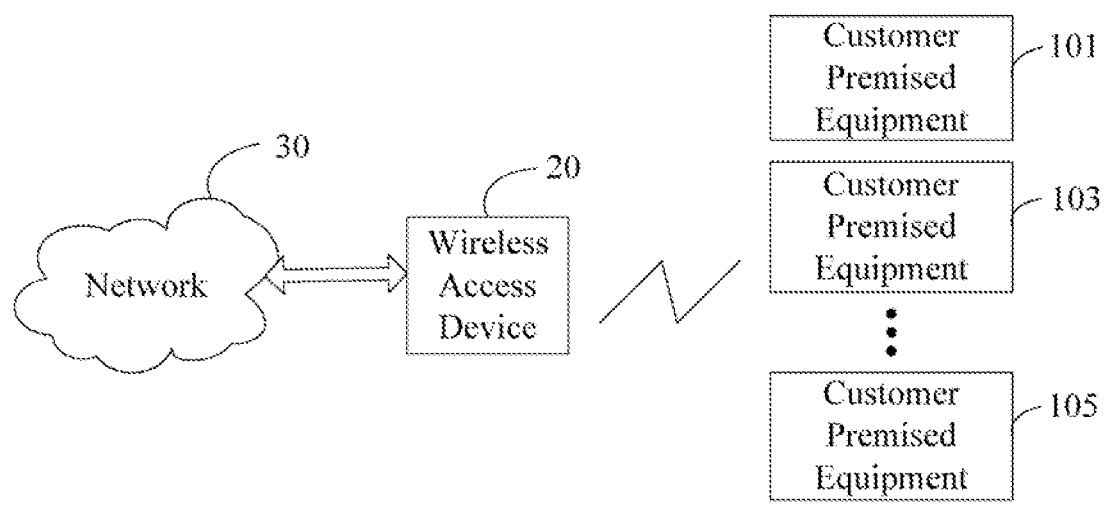
FIG. 1 is a schematic diagram of an application environment of one embodiment of a wireless access device of the present disclosure.

FIG. 1 is a schematic diagram of an application environment of one embodiment of a wireless access device 20 of the present disclosure. In one embodiment, the wireless access device 20 communicates with a plurality of customer premised equipments (CPEs), such as, CPEs 101, 103, and 105, wirelessly. The CPEs 101~105 accesses a network 30 by way of the wireless access device 20. In one embodiment, the CPE 101, 103, or 105 may be a personal computer (PC), a notebook, or a mobile network device (MID), and the network 30 may be the Internet.

Figure 2:
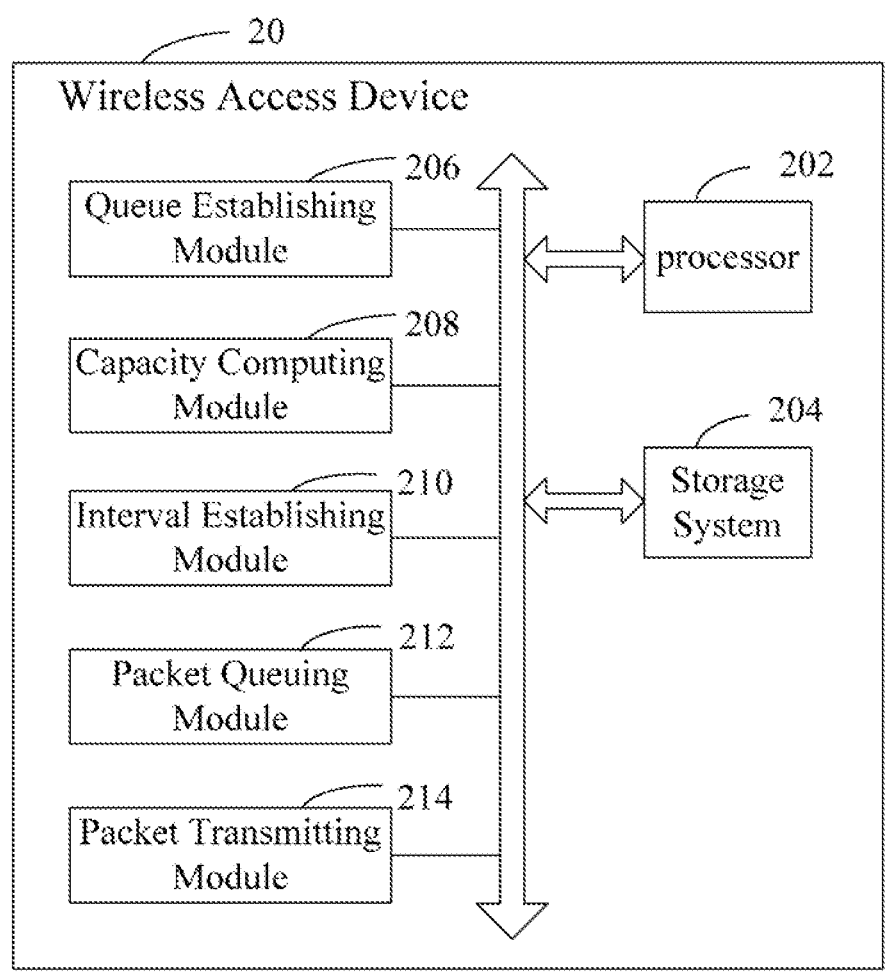
FIG. 2 is a schematic diagram of functional modules of one embodiment of the wireless access device of FIG. 1.

FIG. 2 is a schematic diagram of functional modules of one embodiment of the wireless access device 20 of FIG. 1. In one embodiment, the wireless access device 20 comprises at least one processor 202, a storage system 204, a queue establishing module 206, a capacity computing module 208, a interval establishing module 210, a packet queuing module 212, and a packet transmitting module 214. The modules 206-214 may comprise computerized codes in the form of one or more programs that are stored in the storage system 204. The computerized code comprises instructions that are executed by the at least one processor 202 to provide functions of the modules 206-214.

The storage system 204 stores a plurality of communication parameters of the CPEs 101~105 which are connected to the wireless access device 20. In this embodiment, the communication parameters comprise but are not limited to bandwidth (BW), signal-to-noise ratio (S/N), for example.

The queue establishing module 206 establishes a plurality of queues to store packets received from the network 30, and stores the plurality of queues in the storage system 204. In one embodiment, each of the queues is configured with a sequence number.

Figure 3:
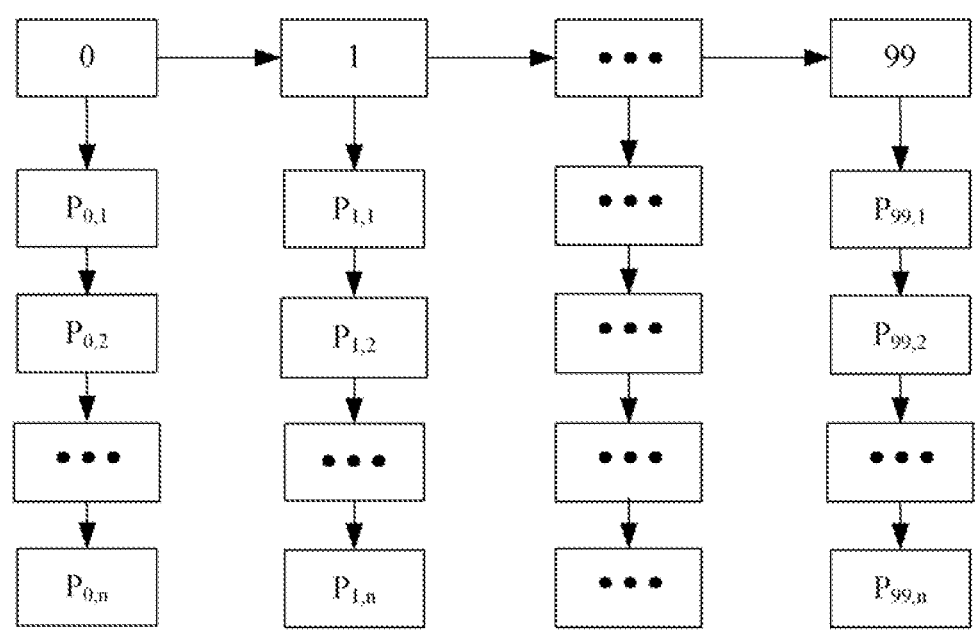
FIG. 3 illustrates a queue table showing the queues stored in a storage system of the wireless access device of one embodiment of the present disclosure.

FIG. 3 illustrates a queue table showing the queues stored in the storage system 204 of the wireless access device 20 of one embodiment of the present disclosure. As shown, the queue establishing module 206 establishes 100 queues to store packets received from the network 30, and sequence number of each of the queues is set from 0 to 99. In one embodiment, a position in the queue table is labeled as $P_{m,n}$, wherein "m" indicates a column number in the queue table, and "n" indicates a row number in the queue table, for example, $P_{99,2}$ indicates the position in the queue table is at column 99 row 2.

Referring back to FIG. 2, the capacity computing module 208 computes capacities of a plurality of channels in communication with the wireless access device 20 and with each of the CPEs respectively according to corresponding communication parameters of each of the CPEs, and computes a total channel capacity according to the capacities of the plurality of channels. In one embodiment, a capacity of one channel (C) is equal to $BW*Log_2(1+S/N)$ according to the Shannon formula.

For example, if a first channel capacity labeled as $C_1$ between CPE 101 and the wireless access device 20 is 30 Mbps, a second channel capacity labeled as $C_2$ between CPE 103 and the wireless access device 20 is 40 Mbps, and a third channel capacity labeled as $C_3$ between CPE 105 and the wireless access device 20 is 30 Mbps, the total channel capacity of the wireless access device 20 is equal to $C_1+C_2+C_3$, namely 100 Mbps.

The interval establishing module 210 computes weight of each of the channel capacities in relation to the total channel capacity. For example, as mentioned above, the first channel capacity $C_1$ is 30 Mbps, the second channel capacity $C_2$ is 40 Mbps, the third channel capacity $C_3$ is 30 Mbps, and the total channel capacity of the wireless access device 20 is equal to 100 Mbps. Therefore, a first weight $W_1$ of the first channel capacity to the total channel capacity is equal to $C_1/(C_1+C_2+C_3)$, namely 30%, a second weight $W_2$ of the second channel capacity to the total channel capacity is equal to $C_2/(C_1+C_2+C_3)$, namely 30%, and a third weight $W_3$ of the third channel capacity to the total channel capacity is equal to $C_3/(C_1+C_2+C_3)$, namely 30%.

However, the interval establishing module 210 needs to distribute a special channel capacity labeled as $C_0$ to transmit broadcast packets to all the plurality of CPEs. In the embodiment, if the special channel capacity $C_0$ is equal to 10 Mbps, the first weight $W_1$ should be rectified as $C_1/(C_1+C_2+C_3)*(100-C_0)/100$, namely 27%, the second weight $W_2$ should be rectified as $C_2/(C_1+C_2+C_3)*(100-C_0)/100$, namely 36%, and the third weight $W_3$ should be rectified as $C_3/(C_1+C_2+C_3)*(100-C_0)/100$, namely 27%.

The interval establishing module 210 distributes intervals for each of the CPEs according to the weight of each of the channel capacities to the total channel capacity and the sequence numbers of the queues. In one embodiment, each of the intervals respectively includes one part of the sequence numbers of the queues. In one embodiment, the interval establishing module 210 further distributes a special interval according to a special weight of the special channel capacity in relation to the total channel capacity.

For example, as mentioned above, the first weight $W_1$, the second weight $W_2$, and the third weight $W_3$ are equal to 27%, 36%, and 27%, respectively, and the sequence numbers of the queues is set from 0 to 99, so a first interval for the CPE 101 distributed by the interval establishing module 210 is [0, 27), a second interval for the CPE 103 distributed by the interval establishing module 210 is [27, 63), a third interval for the CPE 105 distributed by the interval establishing module 210 is [63, 90), the special interval distributed by the interval establishing module 210 is [90, 100).

In other words, referring to FIG. 3, twenty-seven queues with sequence number from 0 to 26 are used to store packets to be transmitted to the CPE 101, thirty-six queues with sequence number from 27 to 62 are used to store packets to be transmitted to the CPE 103, twenty-seven queues with sequence number from 63 to 89 are used to store packets to be transmitted to the CPE 105, and ten queues with sequence number from 90 to 99 are used to store the broadcast packets to be transmitted to all the CPEs.

The packet queuing module 212 receives packets from the network 30, obtains one of the intervals corresponding to one of the CPEs 101~105 with MAC address being the destination MAC address of one of the received packets, and obtains a random number in the obtained interval. In one embodiment, the packet queuing module 212 determines whether the destination MAC address of the received packet is the same as the MAC address of one of the CPEs 101~105 firstly, obtains the random number in the obtained interval corresponding to one of the CPEs 101~105.

For example, if the destination MAC address of the received packet is the same as the MAC address of the CPE 101, the packet queuing module 212 obtains the random number in the first interval [0,27). If the destination MAC address of the received packet is the same as the MAC address of the CPE 103, the packet queuing module 212 obtains the random number in the second interval [27,63). If the destination MAC address of the received packet is the same as the MAC address of the CPE 105, the packet queuing module 212 obtains the random number in the third interval [63,90). If the destination MAC address of the received packet is different from any MAC addresses of the plurality of CPEs 101~105, the packet queuing module 212 obtains the random number in the special interval [90,100).

The packet queuing module 212 stores each of the received packets to one of the queues with sequence number being in the obtained interval. For example, if the random number is 15, the packet queuing module 212 stores the received packet to the sixteenth column among the 100 queues (namely the sequence number of queue is 15).

The packet transmitting module 214 transmits the received packets stored in the plurality of queues in the way of one row by one row. For example, referring to FIG. 3, the packet transmitting module 214 transmits the received packets stored in the first row which located from $P_{0,1}$ to $P_{99,1}$ firstly, then transmits the received packets stored in the second row which located from $P_{0,2}$ to $P_{99,2}$ secondly, . . . , transmits the received packets stored in the last row which located from $P_{0,n}$ to $P_{99,n}$ at last. In that case, the packet transmitting module 214 could synchronously transmit at most 100 packets, which enhances the performance of dealing with packets in the wireless access device 20 greatly.

Figure 4:
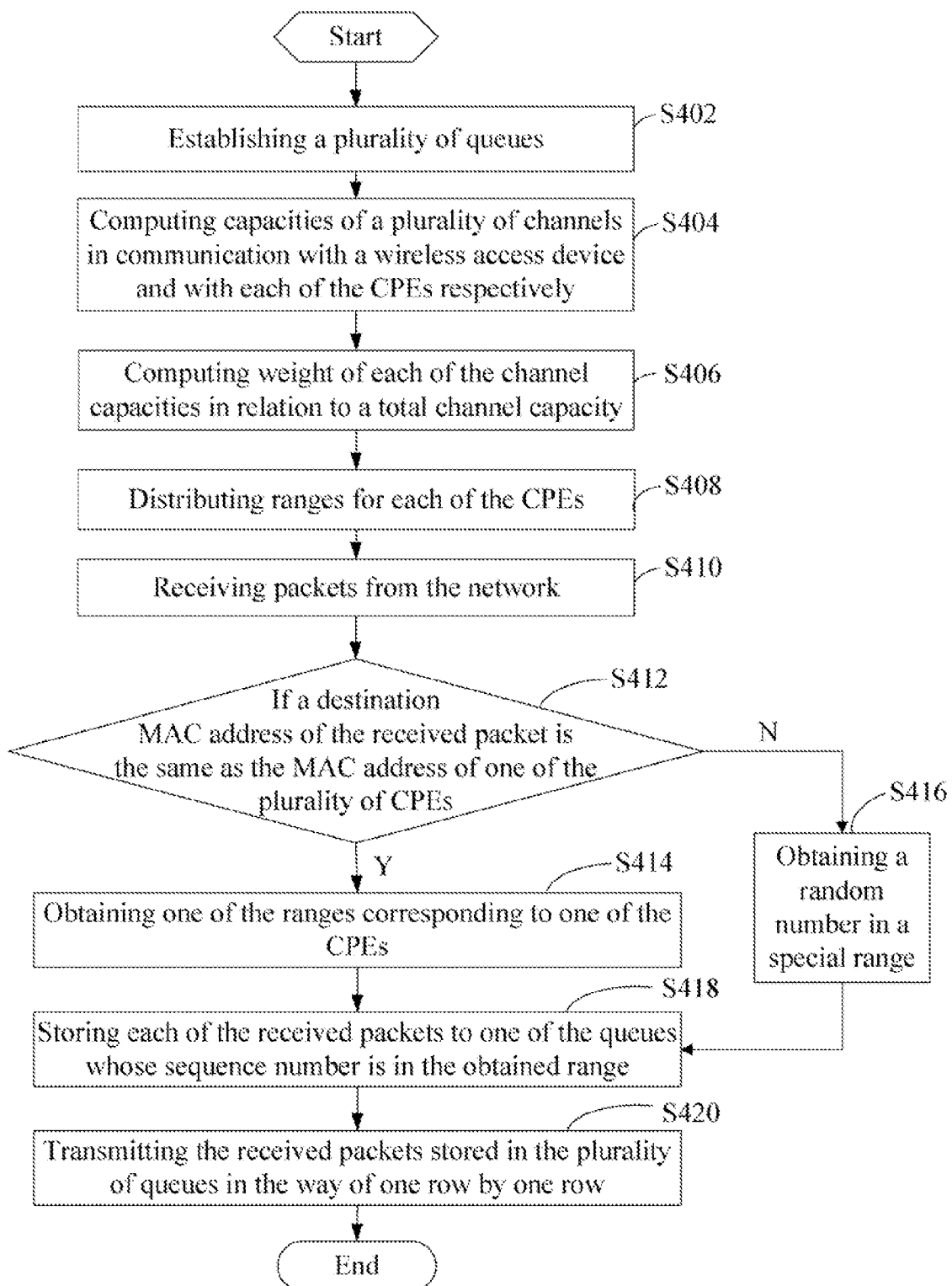
FIG. 4 is a flowchart of transmitting packets on the wireless access device of one embodiment of the present disclosure.

FIG. 4 is a flowchart of transmitting packets on the wireless access device 20 of one embodiment of the present disclosure. The flowchart is executed by the modules of FIG. 2. Depending on different embodiments, additional blocks may be added, others deleted, and the ordering of blocks may be changed while remaining well within the scope of the disclosure.

In block S402, the queue establishing module 206 establishes the plurality of queues to store packets received from the network 30, and stores the plurality of queues in the storage system 204. In one embodiment, each of the queues is configured with a sequence number.

In block S404, the capacity computing module 208 computes the capacities of the plurality of channels in communication with the wireless access device 20 and with each of the CPEs respectively according to corresponding communication parameters of each of the CPEs, and computes a total channel capacity according to the capacities of the plurality of channels. In one embodiment, the capacity of one channel (C) is equal to $BW*Log_2(1+S/N)$ according to the Shannon formula.

In block S406, the interval establishing module 210 computes weight of each of the channel capacities in relation to the total channel capacity. For example, as mentioned above, the first channel capacity $C_1$ is 30 Mbps, the second channel capacity $C_2$ is 40 Mbps, the third channel capacity $C_3$ is 30 Mbps, and the total channel capacity of the wireless access device 20 is equal to 100 Mbps. Therefore, the first weight $W_1$ of the first channel capacity to the total channel capacity is equal to $C_1/(C_1+C_2+C_3)$, namely 30%, the second weight $W_2$ of the second channel capacity to the total channel capacity is equal to $C_2/(C_1+C_2+C_3)$, namely 30%, and the third weight $W_3$ of the third channel capacity to the total channel capacity is equal to $C_3/(C_1+C_2+C_3)$, namely 30%.

However, the interval establishing module 210 needs to distribute the special channel capacity labeled as $C_0$ to transmit broadcast packets to all the plurality of CPEs. In the embodiment, if the special channel capacity $C_0$ is equal to 10 Mbps, the first weight $W_1$ should be rectified as $C_1/(C_1+C_2+C_3)*(100-C_0)/100$, namely 27%, the second weight $W_2$ should be rectified as $C_2/(C_1+C_2+C_3)*(100-C_0)/100$, namely 36%, and the third weight $W_3$ should be rectified as $C_3/(C_1+C_2+C_3)*(100-C_0)/100$, namely 27%.

In block S408, the interval establishing module 210 distributes intervals for each of the CPEs according to the weight of each of the channel capacities to the total channel capacity and the sequence numbers of the queues. In one embodiment, each of the intervals respectively includes one part of the sequence numbers of the queues. In one embodiment, the interval establishing module 210 further distributes the special interval according to a special weight of the special channel capacity to the total channel capacity.

For example, as mentioned above, the first weight $W_1$, the second weight $W_2$, and the third weight $W_3$ are equal to 27%, 36%, and 27%, respectively, and the sequence numbers of the queues is set from 0 to 99, so the first interval for the CPE 101 distributed by the interval establishing module 210 is [0, 27), the second interval for the CPE 103 distributed by the interval establishing module 210 is [27, 63), the third interval for the CPE 105 distributed by the interval establishing module 210 is [63, 90), the special interval distributed by the interval establishing module 210 is [90, 100).

In block S410, the packet queuing module 212 receives packets from the network 30.

In block S412, the packet queuing module 212 determines whether the destination MAC address of the received packet is the same as the MAC address of one of the CPEs.

If the destination MAC address of the received packet is the same as the MAC address of one of the CPEs, in block S414, the packet queuing module 212 obtains one of the intervals corresponding to one of the CPEs whose MAC address is the same as the destination MAC address of the received packets, and obtains the random number in the obtained interval.

For example, if the destination MAC address of the received packet is the same as the MAC address of CPE 101, the packet queuing module 212 obtains the random number in the first interval [0,27). If the destination MAC address of the received packet is the same as the MAC address of CPE 103, the packet queuing module 212 obtains the random number in the second interval [27,63). If the destination MAC address of the received packet is the same as the MAC address of CPE 105, the packet queuing module 212 obtains the random number in third interval [63,90).

If the destination MAC address of the received packet is different from the MAC address of all the plurality of CPEs, in block S416, the packet queuing module 212 obtains the random number in the special interval [90,100).

In block S418, the packet queuing module 212 stores each of the received packets to one of the queues with sequence number being in the obtained interval. For example, if the random number is 15, the packet queuing module 212 stores the received packet to the sixteenth column among the 100 queues (namely the sequence number of queue is 15).

In block S420, the packet transmitting module 214 transmits the received packets stored in the plurality of queues in the way of one row by one row.

For example, referring to FIG. 3, the packet transmitting module 214 transmits the received packets stored in the first row which located from $P_{0,1}$ to $P_{99,1}$ firstly, transmits the received packets stored in the second row which located from $P_{0,2}$ to $P_{99,2}$ secondly, . . . , transmits the received packets stored in the last row which located from $P_{0,n}$ to $P_{99,n}$ at last. In that case, the packet transmitting module 214 could synchronously transmit at most 100 packets, which enhances the performance of dealing with packets in the wireless access device 20 greatly.

While various embodiments and methods of the present disclosure have been described, it should be understood that they have been presented by example only and not by limitation. Thus the breadth and scope of the present disclosure should not be limited by the above-described embodiments, but should be defined only in accordance with the following claims and their equivalents.

What is claimed is:

1. A wireless access device in communication with a plurality of customer premised equipments via a network, the wireless access device comprising:
at least one processor;
a storage system operable to store a plurality of communication parameters of each of the customer premised equipments and one or more programs that are executed by the at least one processor, the one or more programs comprising:
a queue establishing module operable to establish a plurality of queues to store packets received from the network, and to store the plurality of queues in the storage system, wherein each of the queues is configured with a sequence number;
a capacity computing module operable to compute capacities of a plurality of channels in communication with the wireless access device and with each of the customer premised equipments respectively according to corresponding communication parameters of each of the customer premised equipments, and to compute a total channel capacity according to the capacities of the plurality of channels;
a interval establishing module to compute weight of each of the channel capacities in relation to the total channel capacity, and to distribute intervals for each of the customer premised equipments according to the weight of each of the channel capacities to the total channel capacity and the sequence numbers of the queues, and to distribute a special channel capacity to transmit broadcast packets to all the customer premised equipments and to distribute a special interval according to a special weight of the special channel capacity in relation to the total channel capacity, wherein each of the intervals respectively includes one part of the sequence numbers of the queues;
a packet queuing module operable to receive packets from the network, to obtain one of the intervals corresponding to one of the customer premised equipments with MAC address being the destination MAC address of one of the received packets, and to store each of the received packets to one of the queues with sequence number being in the obtained interval; and
a packet transmitting module operable to transmit the received packets stored in the plurality of queues in the way of one row by one row;
wherein the communication parameters comprise a bandwidth of each of the customer premised equipments and a signal-to-noise ratio of each of the customer premised equipments.

2. The wireless access device as claimed in claim 1, wherein the packet queuing module is further operable to obtain the special interval if the MAC address of one of the customer premised equipments is different from the destination MAC address of one of the received packets, and to store each of the received packets to one of the queues whose sequence number is in the special interval.

3. A method of transmitting packets in a wireless access device, the wireless access device in communication with a plurality of customer premised equipments via a network and comprising a storage system to store a plurality of communication parameters of each of the customer premised equipments, the method of transmitting packets comprising:
establishing a plurality of queues and storing the plurality of queues in the storage system, wherein each of the queues is configured with a sequence number;
computing capacities of a plurality of channels in communication with the wireless access device and with each of the customer premised equipments respectively according to corresponding communication parameters of each of the customer premised equipments;
computing a total channel capacity according to the capacities of the plurality of channels;
computing weight of each of the channel capacities in relation to the total channel capacity;
distributing intervals for each of the customer premised equipments according to the weight of each of the channel capacities to the total channel capacity and the sequence numbers of the queues, and distributing a special channel capacity to transmit broadcast packets to all the customer premised equipments, and distributing a special interval according to a special weight of the special channel capacity in relation to the total channel capacity, wherein each of the intervals respectively includes one part of the sequence numbers of the queues;

receiving packets from the network;

obtaining one of the intervals corresponding to one of the customer premised equipments with MAC address being the destination MAC address of one of the received packets;

storing each of the received packets to one of the queues with sequence number being in the obtained interval; and transmitting the received packets stored in the plurality of queues in the way of one row by one row.

4. The method of transmitting packets as claimed in claim 3, wherein the communication parameters comprises a bandwidth of each of the customer premised equipments and a signal-to-noise ratio of each of the customer premised equipments.

5. The method of transmitting packets as claimed in claim 3, further comprising:

obtaining the special interval if the MAC address of one of the customer premised equipments is different from the destination MAC address of one of the received packets; and storing each of the received packets to one of the queues whose sequence number is in the special interval.

\* \* \* \* \*